United States Patent
Gu et al.

(10) Patent No.: US 12,501,149 B2
(45) Date of Patent: Dec. 16, 2025

(54) IMAGE SHOOTING METHOD AND APPARATUS, ELECTRONIC DEVICE, AND READABLE STORAGE MEDIUM

(71) Applicant: VIVO MOBILE COMMUNICATION CO., LTD., Guangdong (CN)

(72) Inventors: Hanzhi Gu, Guangdong (CN); Guoqing Shi, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 219 days.

(21) Appl. No.: 18/326,663

(22) Filed: May 31, 2023

(65) Prior Publication Data

US 2023/0328367 A1    Oct. 12, 2023

Related U.S. Application Data

(63) Continuation of application No. PCT/CN2021/134312, filed on Nov. 30, 2021.

(30) Foreign Application Priority Data

Dec. 7, 2020 (CN) .......................... 202011429676.4

(51) Int. Cl.
*H04N 23/60* (2023.01)
*G03B 17/56* (2021.01)
(Continued)

(52) U.S. Cl.
CPC ........... *H04N 23/64* (2023.01); *G03B 17/561* (2013.01); *G06T 5/50* (2013.01); *H04N 23/632* (2023.01); *G06T 2207/20221* (2013.01)

(58) Field of Classification Search
None
See application file for complete search history.

(56) References Cited

U.S. PATENT DOCUMENTS

| | | | |
|---|---|---|---|
| 10,567,641 B1 | 2/2020 | Rueckner | |
| 2008/0024614 A1 | 1/2008 | Li | |

(Continued)

FOREIGN PATENT DOCUMENTS

| | | | |
|---|---|---|---|
| CN | 105467741 A | 4/2016 | |
| CN | 105554383 A | 5/2016 | |

(Continued)

OTHER PUBLICATIONS

Extended European Search Report for Application No. 21902438.7, May 31, 2024, 11 Pages.

(Continued)

*Primary Examiner* — James M Hannett
(74) *Attorney, Agent, or Firm* — BROOKS KUSHMAN P.C.

(57) ABSTRACT

An image shooting method and apparatus, an electronic device, and a readable storage medium and pertains to the field of image processing. The specific implementation includes receiving a first input for triggering image shooting; obtaining, in response to the first input, multiple frames of first images shot by the first camera and multiple frames of second images shot by the second camera, where in an image shooting process, the free gimbal controls an actual shooting position of the first camera to remain unchanged, and the fixed gimbal controls the second camera to move along with the electronic device; and compositing the multiple frames of first images and the multiple frames of second images to obtain a composite image.

17 Claims, 7 Drawing Sheets

(51) Int. Cl.
*G06T 5/50* (2006.01)
*H04N 23/63* (2023.01)

(56) References Cited

U.S. PATENT DOCUMENTS

| | | | |
|---|---|---|---|
| 2014/0240453 | A1 | 8/2014 | Kim et al. |
| 2015/0097982 | A1 | 4/2015 | Tomizawa et al. |
| 2019/0258143 | A1 | 8/2019 | Zhou et al. |
| 2020/0244854 | A1* | 7/2020 | Lee .................. H04N 23/45 |
| 2021/0240059 | A1 | 8/2021 | Ma et al. |

FOREIGN PATENT DOCUMENTS

| | | |
|---|---|---|
| CN | 105611187 A | 5/2016 |
| CN | 105635555 A | 6/2016 |
| CN | 105657103 A | 6/2016 |
| CN | 107566738 A | 1/2018 |
| CN | 109348091 A | 2/2019 |
| CN | 109639975 A | 4/2019 |
| CN | 110290300 A | 9/2019 |
| CN | 106412439 B | 1/2020 |
| CN | 110661979 A | 1/2020 |
| CN | 111213001 A | 5/2020 |
| CN | 112040126 A | 12/2020 |
| CN | 112492214 A | 3/2021 |
| JP | 2005080117 A | 3/2005 |
| JP | 2013059026 A | 3/2013 |
| JP | 2015073222 A | 4/2015 |
| KR | 20170057058 A | 5/2017 |
| WO | 2018092282 A1 | 5/2018 |
| WO | 2019208915 A1 | 10/2019 |
| WO | 2020107295 A1 | 6/2020 |

OTHER PUBLICATIONS

First Office Action for Japanese Application No. 2023-532574, dated Apr. 26, 2024, 4 Pages.
Second Office Action for Japanese Application No. 2023-532574, dated Oct. 29, 2024, 8 Pages.
First Office Action for Chinese Application No. 202011429676.4, dated Oct. 18, 2021, 8 Pages.
International Search Report and Written Opinion for Application No. PCT/CN2021/134312, dated Feb. 17, 2022, 8 Pages.
Third Japanese Office Action for Japanese Patent Application No. 2023-532574 mailed May 27, 2025. 12 pages.

* cited by examiner

IMAGE SHOOTING METHOD AND APPARATUS, ELECTRONIC DEVICE, AND READABLE STORAGE MEDIUM

CROSS-REFERENCE TO RELATED APPLICATIONS

This application is a continuation of PCT International Application No. PCT/CN2021/134312 filed on Nov. 30, 2021, which claims priority to Chinese Patent Application No. 202011429676.4, filed on Dec. 7, 2020, which are incorporated herein by reference in their entireties.

TECHNICAL FIELD

This application pertains to the field of image processing and specifically relates to an image shooting method and apparatus, an electronic device, and a readable storage medium.

BACKGROUND

At present, in a scenario of shooting multiple frames of images like light painting shooting, a shooting device generally needs to be in fixed shooting for a long time and is not allowed to move significantly so as not to affect the shooting quality. Therefore, the shooting device is typically stabilized with the help of equipment like a tripod, which, however, makes shooting difficult.

SUMMARY

In a first aspect, an embodiment of this application provides an image shooting method applied to an electronic device. The electronic device includes a first camera, a second camera, a free gimbal, and a fixed gimbal, the first camera being mounted on the free gimbal, and the second camera being mounted on the fixed gimbal, and the method includes:
  receiving a first input for triggering image shooting;
  obtaining, in response to the first input, multiple frames of first images shot by the first camera and multiple frames of second images shot by the second camera, where in an image shooting process, the free gimbal controls an actual shooting position of the first camera to remain unchanged, and the fixed gimbal controls the second camera to move along with the electronic device; and
  compositing the multiple frames of first images and the multiple frames of second images to obtain a composite image.

In a second aspect, an embodiment of this application provides an image shooting apparatus applied to an electronic device. The electronic device includes a first camera, a second camera, a free gimbal, and a fixed gimbal, the first camera being mounted on the free gimbal, and the second camera being mounted on the fixed gimbal, and the apparatus includes:
  a receiving module configured to receive a first input for triggering image shooting;
  an obtaining module configured to obtain, in response to the first input, multiple frames of first images shot by the first camera and multiple frames of second images shot by the second camera, where in an image shooting process, the free gimbal controls an actual shooting position of the first camera to remain unchanged, and the fixed gimbal controls the second camera to move along with the electronic device; and
  a compositing module configured to composite the multiple frames of first images and the multiple frames of second images to obtain a composite image.

In a third aspect, an embodiment of this application provides an electronic device. The electronic device includes a processor, a memory, and a program or instructions stored in the memory and capable of running on the processor, where when the program or instructions are executed by the processor, the steps of the method according to the first aspect are implemented.

In a fourth aspect, an embodiment of this application provides a readable storage medium. The readable storage medium stores a program or instructions, and when the program or instructions are executed by a processor, the steps of the method according to the first aspect are implemented.

In a fifth aspect, an embodiment of this application provides a chip. The chip includes a processor and a communication interface, the communication interface is coupled to the processor, and the processor is configured to run a program or instructions to implement the method according to the first aspect.

In a sixth aspect, an embodiment of this application provides a computer program product. The computer program product is stored in a non-transitory storage medium, and the computer program product is executed by at least one processor to implement the method according to the first aspect.

DESCRIPTION OF DESCRIPTION

The following clearly describes the technical solutions in the embodiments of this application with reference to the accompanying drawings in the embodiments of this application. Apparently, the described embodiments are some but not all of the embodiments of this application. All other embodiments obtained by persons of ordinary skill in the art based on the embodiments of this application without creative efforts shall fall within the protection scope of this application.

The terms "first", "second", and the like in the specification and claims of this application are used to distinguish between similar objects rather than to describe a specific order or sequence. It should be understood that terms used in this way are interchangeable in appropriate circumstances such that the embodiments of this application can be implemented in an order other than those illustrated or described herein. In addition, "first" and "second" are typically used to distinguish between objects of a same type but do not limit quantities of the objects. For example, there may be one or more first objects. In addition, "and/or" in the specification and claims represents at least one of connected objects, and the character "/" generally indicates that the contextually associated objects have an "or" relationship.

The following describes in detail the image shooting method provided in the embodiments of this application by using specific embodiments and application scenarios thereof with reference to the accompanying drawings.

Figure 1:
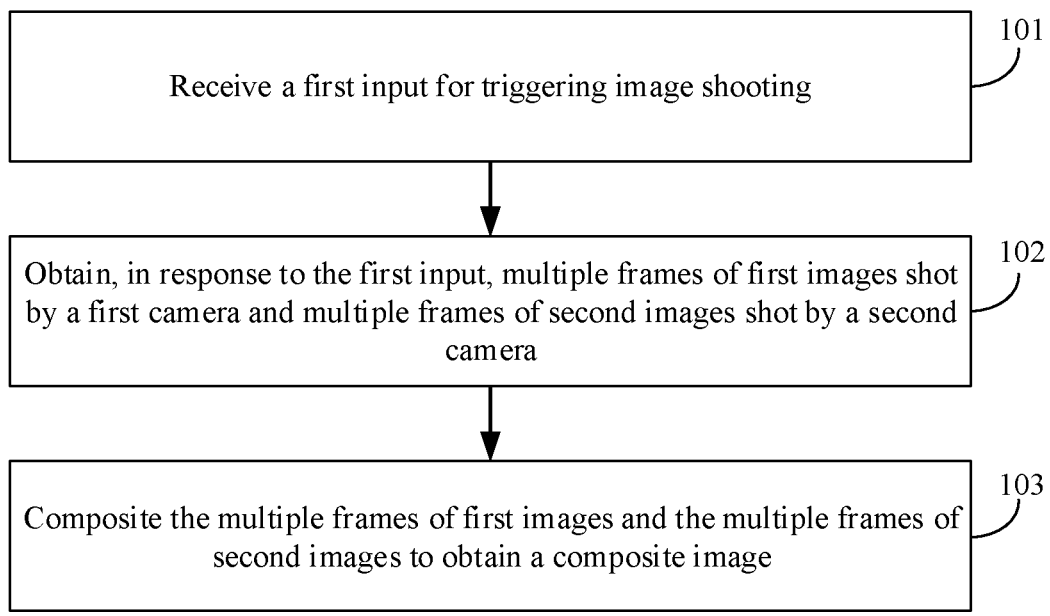
FIG. 1 is a flowchart of an image shooting method according to an embodiment of this application.

Refer to FIG. 1. FIG. 1 is a flowchart of an image shooting method according to an embodiment of this application. The method is applied to an electronic device. The electronic device may include a first camera, a second camera, a free gimbal, and a fixed gimbal. The first camera is mounted on the free gimbal and the second camera is mounted on the fixed gimbal. Both the free gimbal and the fixed gimbal are support devices for mounting and fixing a camera and can provide stabilizing effects. Therefore, no additional fixing devices are required.

As shown in FIG. 1, the image shooting method provided in this embodiment of this application may include the following steps.

Step 101. Receive a first input for triggering image shooting.

In this embodiment, after a shooting function of the electronic device is enabled, an instruction for triggering image shooting may be input into the electronic device by a user tapping a shooting button. Correspondingly, the electronic device receives the first input for triggering image shooting.

Step 102. Obtain, in response to the first input, multiple frames of first images shot by the first camera and multiple frames of second images shot by the second camera.

In this embodiment, in an image shooting process, the free gimbal controls an actual shooting position of the first camera to remain unchanged, and the fixed gimbal controls the second camera to move/shift along with the electronic device. In other words, the role of the free gimbal is to control the first camera on it to rotate in a negative direction when the electronic device rotates in a positive direction or control the first camera on it to rotate in a positive direction when the electronic device rotates in an opposite direction, so as to lock a shooting object and ensure that the actual shooting position of the first camera remains unchanged. The role of the fixed gimbal is to control the second camera to move along with the electronic device in the image shooting process, in other words, control the second camera to remain stationary with respect to the electronic device, and to provide proper stabilizing effects when the electronic device rotates, so as to guarantee the image quality.

In a specific example, the first images shot by the first camera and/or the second images shot by the second camera may be stored in the electronic device in the form of a buffer queue. When images stored reach an upper limit, an image stored at the head of the buffer queue may be discarded and a new image shot may be stored at the tail of the buffer queue. The upper limit may be set based on an actual requirement of the user. For example, the upper limit may be set to the number of images shot in 2s. To be specific, if the first camera and the second camera each shoot 30 frames of images per second, the upper limit of the buffer queue is 60 frames of images.

Step 103. Composite the multiple frames of first images and the multiple frames of second images to obtain a composite image.

It should be noted that the image compositing method is not limited in this embodiment of this application, and an existing image compositing method may be used. Scenarios to which this embodiment of this application is applicable include but are not limited to the scenarios of shooting multiple frames of images, such as a light painting shooting scenario and a panorama shooting scenario.

In the image shooting method of this embodiment of this application, after the first input for triggering image shooting is received, the multiple frames of first images shot by the first camera mounted on the free gimbal and the multiple frames of second images shot by the second camera mounted on the fixed gimbal can be obtained, and the multiple frames of first images and the multiple frames of second images can be composited to obtain the composite image. In this way, gimbals rather than equipment like a tripod are used to assist in shooting of multiple frames of images so that the shooting difficulty can be reduced. Further, in the image shooting process, the free gimbal controls the actual shooting position of the first camera to remain unchanged, and the fixed gimbal controls the second camera to move along with the electronic device. Therefore, the first camera and the second camera can shoot different image contents so that the final composite image contains more image contents, thereby improving the image quality.

In this embodiment of this application, to guarantee image compositing effects, a first target image may be selected from the multiple frames of first images, a second target image may be selected from the multiple frames of second images, and the first target image and the second target image can be composited to obtain the composite image. There may be one or more frames of first target images. There may be one or more frames of second target images. The electronic device may select the first target image and the second target image based on a user selection operation or a preset selection rule on the electronic device. This is not limited.

Optionally, the image compositing procedure in step 103 may include selecting a first target image from the multiple frames of first images and selecting multiple frames of second target images from the multiple frames of second images; and complementing image content of the first target image by using the multiple frames of second target images, to obtain the composite image.

In an embodiment, the first target image and the second target image may be selected from buffered images after shooting is completed. In this way, selecting the first target image and the second target image after shooting is completed enables a fully buffered image-based selection, thereby guaranteeing the quality of selected images.

It should be noted that because the actual shooting position of the first camera remains unchanged, in other words, the first camera actually shoots the multiple frames of images at a shooting start position, when the first target image is selected from the multiple frames of first images shot by the first camera, an image with the highest definition in the multiple frames of first images may be selected as the first target image. Because the second camera moves or rotates in the image shooting process, in other words, the images shot by the second camera are images for different scenes, to guarantee image compositing effects, multiple frames of second target images may be selected from the second images shot by the second camera, and the multiple frames of second target images are images respectively shot when the second camera rotates to different angles. For example, if a maximum rotation angle of the free gimbal is T and 6 frames of second target images are selected, the 6 frames of second target images may be images respectively corresponding to rotation angles of T/6, T/3, T/2, 2T/3, 5T/6, and T of the free gimbal.

In this way, the composite image not only contains an image content at the shooting start position but also is complemented with an image content shot after the electronic device is rotated, thereby ensuring the quality of the composite image.

In this embodiment of this application, in a case that a rotation angle of the free gimbal exceeds a preset threshold, the shooting start position of the first camera cannot be locked, in other words, in a case that a rotation angle of the free gimbal reaches a preset threshold, the free gimbal reaches its limit of locking the first camera, and cannot lock the shooting start position of the first camera if it continues to rotate. Therefore, when the electronic device detects that the rotation angle of the free gimbal reaches the preset threshold, the shooting process may be stopped. The preset threshold may be set based on the corresponding free gimbal.

Optionally, the image shooting method of this embodiment may further include stopping the shooting process when it is detected that a rotation angle of the free gimbal reaches a preset threshold or when an input for triggering a stop of image shooting has been received.

That is, in the image shooting process, the electronic device may monitor whether a rotation angle of the free gimbal reaches a preset threshold or whether an input for triggering a stop of image shooting has been received, and stop the shooting process when it is detected that the rotation angle of the free gimbal reaches the preset threshold or that the input for triggering a stop of image shooting has been received. The input may be implemented by the user tapping a shooting button.

In this embodiment of this application, the first target image and the second target image may be selected in response to a user selection operation. The process of selecting the first target image and the second target images may include:

receiving a second input for the multiple frames of first images and the multiple frames of second images, where the second input may include but is not limited to a press operation and a swipe operation; and selecting, in response to the second input, the first target image from the multiple frames of first images and the multiple frames of second target images from the multiple frames of second images.

In this way, selecting the first target image and second target image desired through a user selection operation can guarantee the quality of the selected images, thereby improving the effects of subsequent image compositing.

In a specific example, after image shooting is completed, the multiple frames of first images and the multiple frames of second images buffered may be displayed on a display screen of the electronic device to allow the user to select the first target image from the multiple frames of first images and the second target image from the multiple frames of second images. The multiple frames of first images and the multiple frames of second images may be displayed on the display screen of the electronic device at the same time or in sequence. For example, the multiple frames of first images are displayed before the multiple frames of second images, or the multiple frames of second images are displayed before the multiple frames of first images.

Optionally, the image shooting method of this embodiment may further include displaying an image shot by the second camera on a preview screen for the user to view.

It should be noted that because the actual shooting position of the first camera remains unchanged, in other words, the images for the shooting start position are locked, and the images shot by the second camera are images for different scenes, it is not necessary to display the images shot by the first camera on the preview screen, and only the images shot by the second camera are displayed.

The following describes specific examples of this application with reference to FIG. 2 to FIG. 5.

Figure 2:
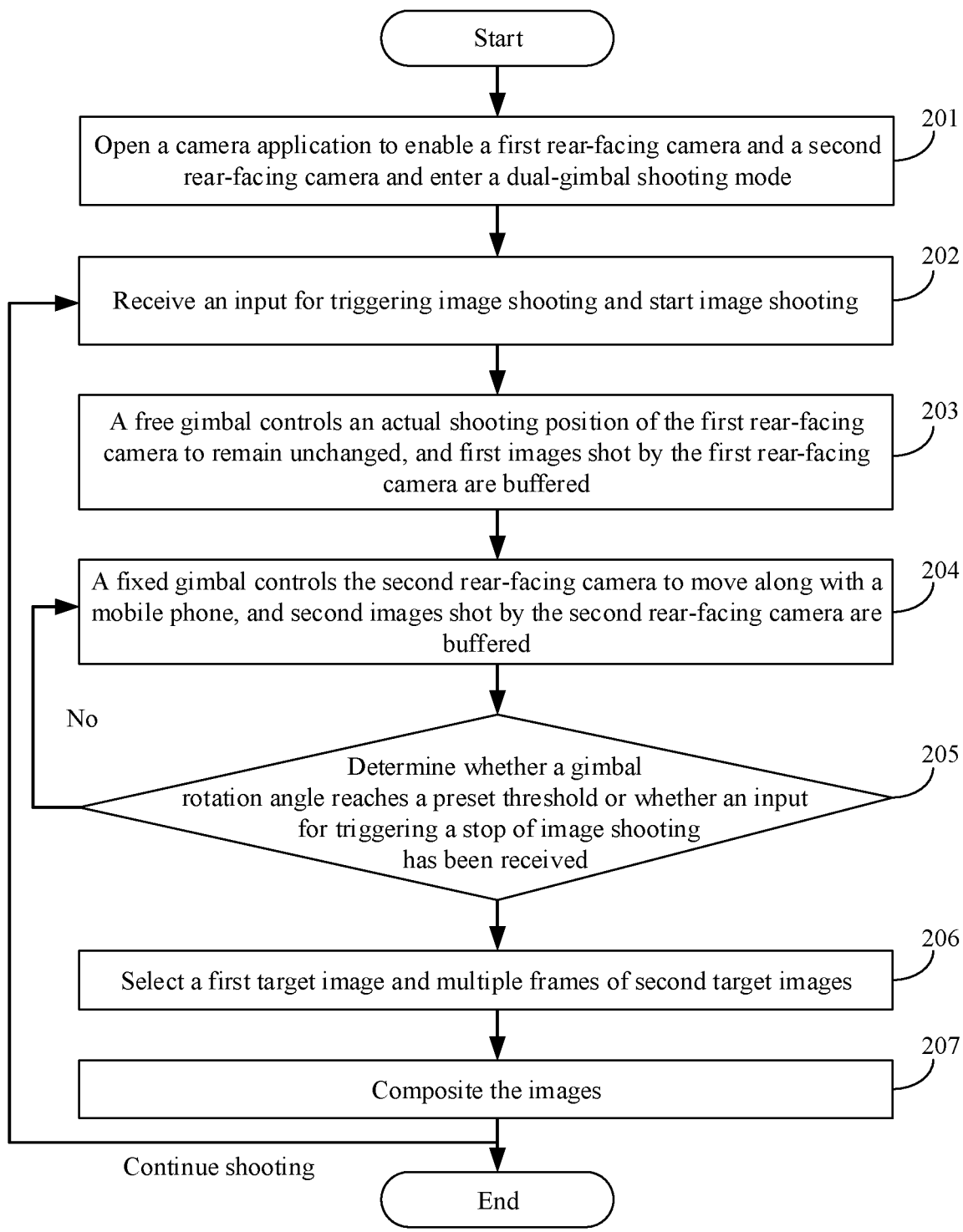
FIG. 2 is a schematic flowchart of an image shooting process according to a specific example of this application.

In a specific example of this application, the electronic device is a mobile phone. For example, the mobile phone includes a first rear-facing camera, a second rear-facing camera, a free gimbal, and a fixed gimbal. The first rear-facing camera is mounted on the free gimbal and the second rear-facing camera is mounted on the fixed gimbal. As shown in FIG. 2, an image shooting process based on light painting shooting may include the following steps.

Step 201. In response to a user input, the mobile phone opens a camera application to enable the first rear-facing camera and the second rear-facing camera and enters a dual-gimbal shooting mode.

Figure 3:
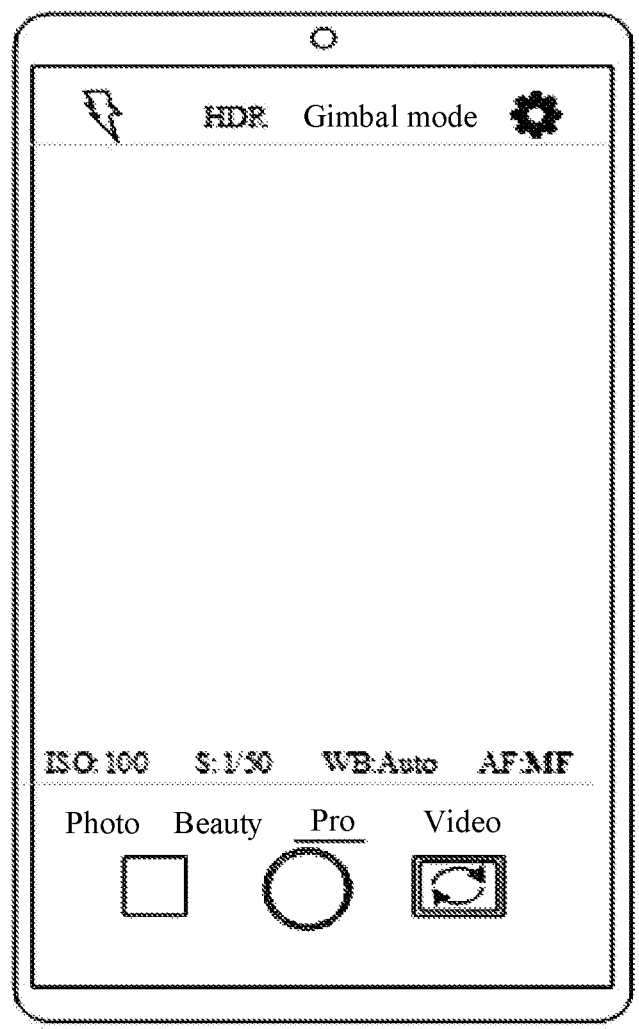
FIG. 3 is a first schematic diagram of a mobile phone screen according to a specific example of this application.

As shown in FIG. 3, after the mobile phone opens the camera application to enable the rear-facing cameras, information that prompts a user whether to select the dual-gimbal shooting mode may be displayed on a screen of the mobile phone. After the user taps a "Pro" button, the mobile phone enters the dual-gimbal shooting mode.

Step 202. In response to a user operation of tapping a shooting button, the mobile phone receives an input for triggering image shooting and starts image shooting.

Both the free gimbal and the fixed gimbal are in effect in the dual-gimbal shooting mode, the free gimbal locks a currently shot image, and when the mobile phone moves in a specified range, the free gimbal also moves correspondingly to guarantee an unchanged actual shooting position. Therefore, to start light painting shooting, the user needs to tap the shooting button, and image shooting starts immediately after the tapping.

Step 203. In an image shooting process, the mobile phone moves, the free gimbal controls the actual shooting position of the first rear-facing camera to remain unchanged, in other words, a shooting start position is locked, and first images shot by the first rear-facing camera are buffered.

Step 204. In the image shooting process, the mobile phone moves, the fixed gimbal controls the second rear-facing camera to move along with the mobile phone, in other words, the mobile phone remains stationary with respect to the second rear-facing camera, and second images shot by the second rear-facing camera are buffered.

During light painting shooting, a long exposure time is often required. In this process, the fixed gimbal can provide proper stabilizing effects. Therefore, no additional fixed devices are needed.

Step 205. Determine whether a rotation angle of the free gimbal reaches a preset threshold or whether an input for triggering a stop of image shooting has been received.

Figure 4:
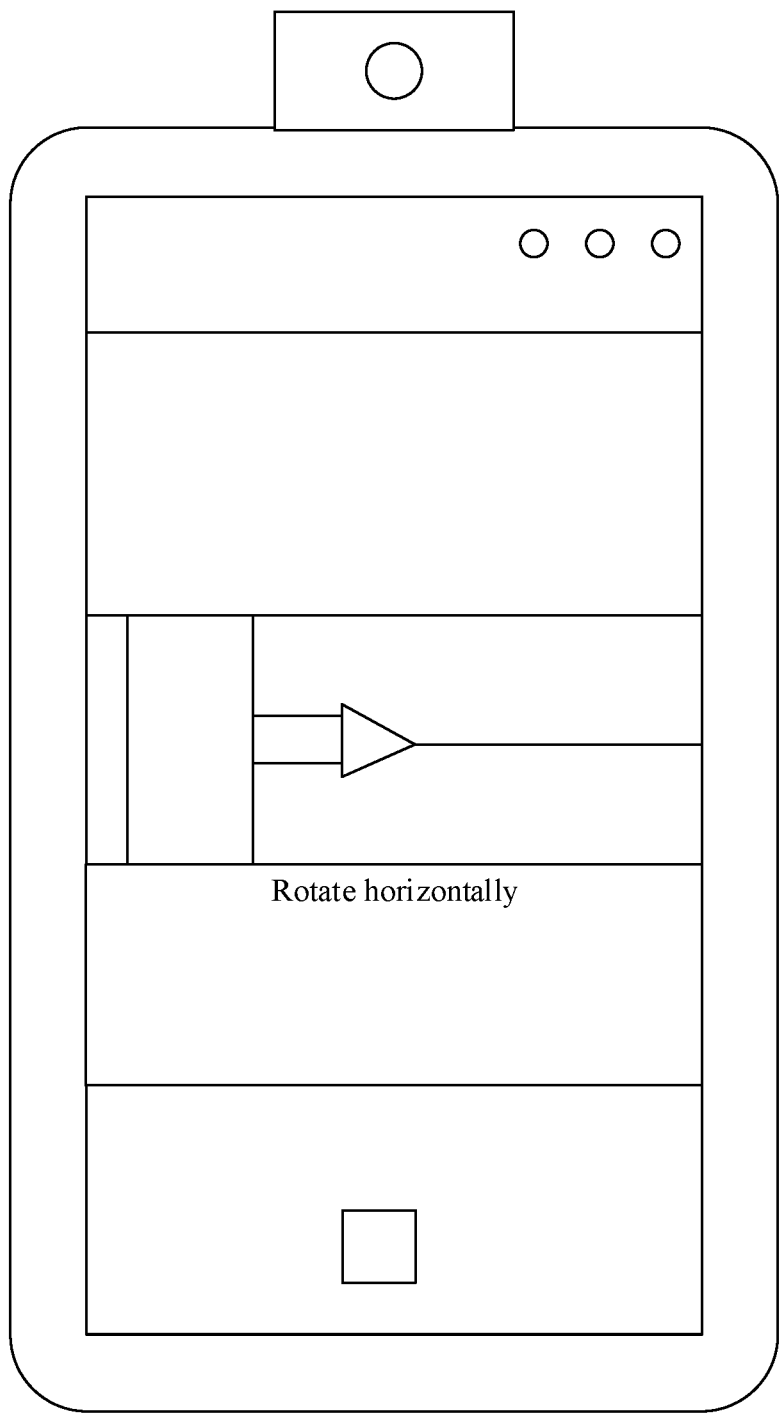
FIG. 4 is a second schematic diagram of a mobile phone screen according to a specific example of this application.

In an embodiment, because the free gimbal cannot endlessly compensate for the displacement of the camera, the rotation of the free gimbal may be shown by a rectangular box shown in FIG. 4 on a screen of the mobile phone when the mobile phone is moving, so that the user can learn about movement of the free gimbal.

In a shooting scenario based on light graffiti of light painting, the free gimbal has locked the shooting start position, and as the user starts to draw a light graffiti pattern, the shooting user starts to move the mobile phone correspondingly until the whole pattern is finished. In the shooting process, the application of the mobile phone needs to determine whether a maximum rotation of the free gimbal has been reached. It is assumed that a maximum rotation angle of the free gimbal is T. When the mobile phone starts to move, the free gimbal locks the shooting start position through rotation of the free gimbal. When a rotation angle of the free gimbal reaches T, it means that a shooting limit is reached, and if rotation continues, the free gimbal can no longer lock the shooting start position. When the user taps the shooting button again to input a shooting stop command or when the free gimbal reaches a rotation limit, the shooting is completed and step 206 is to be performed.

Step 206. After shooting is completed, the first images shot by the first rear-facing camera are read so as to select a first target image, and the second images shot by the second rear-facing camera are read so as to select multiple frames of second target images.

The free gimbal locks the shooting start position all the time, and therefore the images shot by the free gimbal are more important. The fixed gimbal shoots as the mobile phone rotates and therefore more details are complemented. Therefore, when the images corresponding to these two gimbals are read, a clearest image may be selected from the images corresponding to the free gimbal, and because the images corresponding to the fixed gimbal are images for different scenes, multiple frames of images at different rotation angles need to be selected.

Step 207. Composite the first target image and the multiple frames of second target images to get the composite image.

Figure 5:
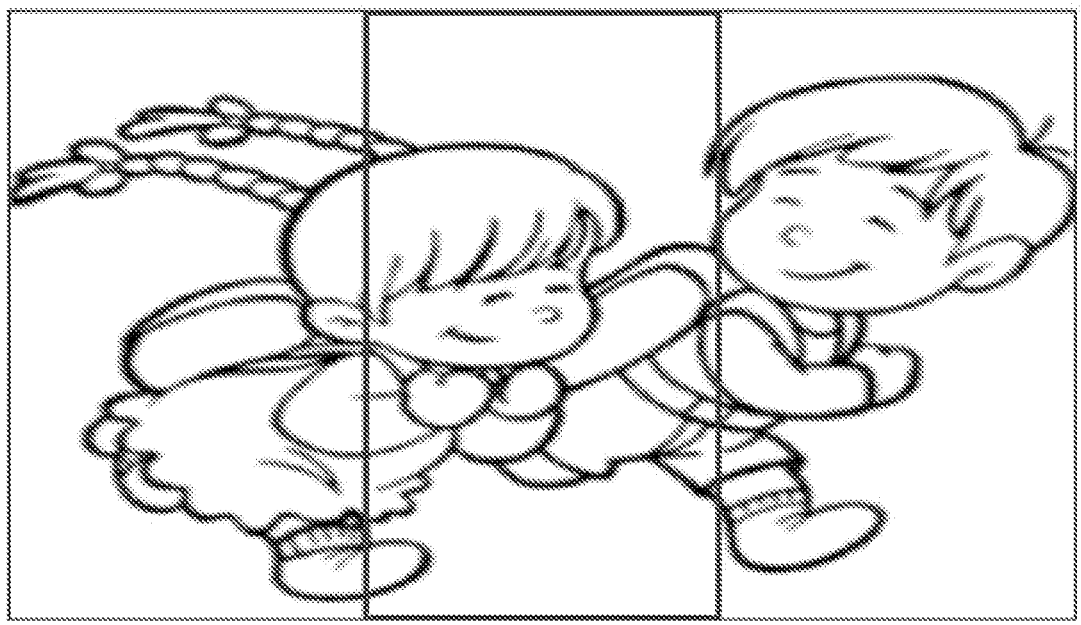
FIG. 5 is a schematic diagram an image compositing procedure according to a specific example of this application.

For example, as shown in FIG. 5, the first image from the left is the first image shot by the free gimbal, and because multiple frames are shot, a series of saved clear images may be popped up by tapping on this region, and a clearest image is selected in response to a user input. The second and third images from the left are extended images obtained through rotation of the fixed gimbal and mobile phone, and may be freely selected by the user to complement more scenes beyond a shooting start scene. After the user selects images to be composited, image compositing is completed in the background. In this way, the composite image can be obtained by compositing the three images shown in FIG. 5.

Afterwards, if the user continues to perform image shooting, go back to step 202, otherwise, exit the cameras.

In this way, with the free gimbal and fixed gimbal in this example of this application, the shooting start position is locked, and images shot after rotation of the mobile phone can be added. Finally, shooting in multi-frame scenario is implemented through image compositing.

It should be noted that the image shooting method according to this embodiment of this application may be executed by an image shooting apparatus or a control module for executing the image shooting method in the image shooting apparatus. In this embodiment of this application, the image shooting method being executed by the image shooting apparatus is used as an example to describe the image shooting apparatus according to the embodiments of this application.

Figure 6:
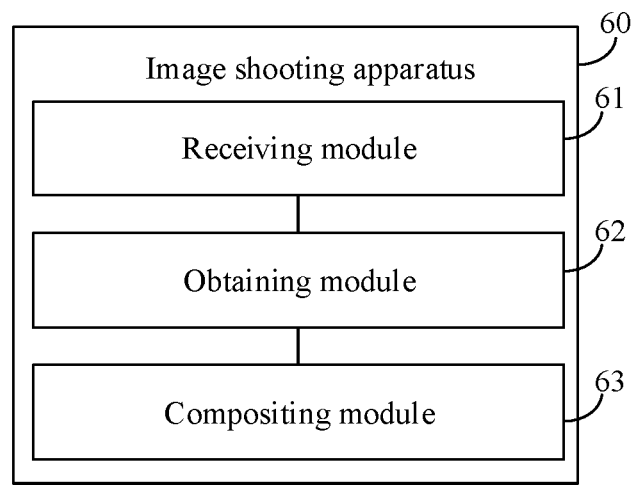
FIG. 6 is a schematic structural diagram of an image shooting apparatus according to an embodiment of this application.

Refer to FIG. 6. FIG. 6 is a schematic structural diagram of an image shooting apparatus according to an embodiment of this application. The apparatus is applied to an electronic device. The electronic device may include a first camera, a second camera, a free gimbal, and a fixed gimbal. The first camera is mounted on the free gimbal and the second camera is mounted on the fixed gimbal. Both the free gimbal and the fixed gimbal are support devices for mounting and fixing a camera and can provide stabilizing effects. In an image shooting process, the free gimbal controls an actual shooting position of the first camera to remain unchanged, and the fixed gimbal controls the second camera to move along with the electronic device. As shown in FIG. 6, the image shooting apparatus 60 includes:

a receiving module 61 configured to receive a first input for triggering image shooting;

an obtaining module 62 configured to obtain, in response to the first input, multiple frames of first images shot by the first camera and multiple frames of second images shot by the second camera; and a compositing module 63 configured to composite the multiple frames of first images and the multiple frames of second images to obtain a composite image.

Optionally, the compositing module 63 includes:

a selecting unit configured to select a first target image from the multiple frames of first images and selecting multiple frames of second target images from the multiple frames of second images; and a compositing unit configured to complement image content of the first target image by using the multiple frames of second target images, to obtain the composite image; where the first target image is an image with the highest definition in the multiple frames of first images, and the multiple frames of second target images are images respectively shot when the second camera is rotated to different angles.

Optionally, the image shooting apparatus 60 further includes:

a control module configured to stop the shooting process when it is detected that a rotation angle of the free gimbal reaches a preset threshold or when an input for triggering a stop of image shooting has been received.

Optionally, the selecting unit includes:

a receiving subunit configured to receive a second input for the multiple frames of first images and the multiple frames of second images; and a selecting subunit configured to select, in response to the second input, the first target image from the multiple frames of first images and the multiple frames of second target images from the multiple frames of second images.

Optionally, the image shooting apparatus 60 further includes:

a display module configured to display an image shot by the second camera on a preview screen.

The image shooting apparatus in this embodiment of this application may be an apparatus or a component, integrated circuit, or chip in a terminal. The apparatus may be a mobile electronic device or a non-mobile electronic device. For example, the mobile electronic device may be a mobile phone, a tablet computer, a notebook computer, a palmtop computer, an in-vehicle electronic device, a wearable device, an ultra-mobile personal computer (Ultra-Mobile Personal Computer, UMPC), a netbook, or a personal digital assistant (Personal Digital Assistant, PDA). The non-mobile electronic device may be a personal computer (Personal Computer, PC), a television (Television, TV), a teller machine, a self-service machine, or the like. This is not specifically limited in the embodiments of this application.

The image shooting apparatus in this embodiment of this application may be an apparatus with an operating system. The operating system may be an android (Android) operating system, an iOS operating system, or other possible operating systems. This is not specifically limited in the embodiments of this application.

The image shooting apparatus 60 provided in this embodiment of this application can implement the processes that are implemented in the method embodiment of FIG. 1, with the same technical effects achieved. To avoid repetition, details are not described herein again.

Figure 7:
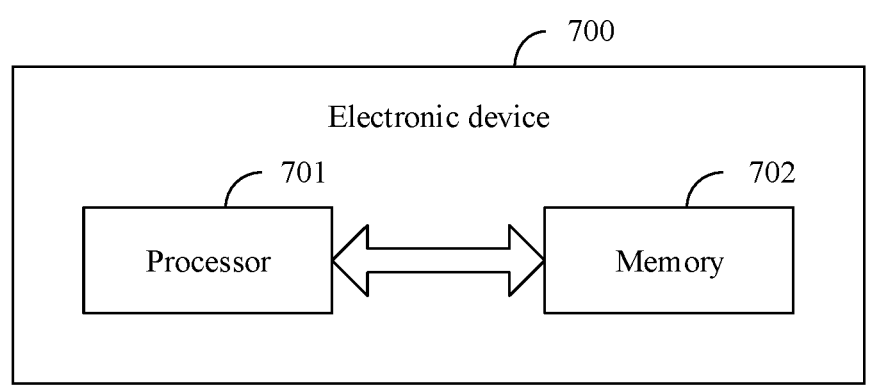
FIG. 7 is a schematic structural diagram of an electronic device according to an embodiment of this application.

Optionally, as shown in FIG. 7, an embodiment of this application further provides an electronic device 700 including a processor 701, a memory 702, and a program or instructions stored in the memory 702 and capable of running on the processor 701. When the program or instructions are executed by the processor 701, the processes of the embodiments of the image shooting method are implemented, with the same technical effects achieved. To avoid repetition, details are not described herein again.

It should be noted that the electronic device in this embodiment of this application includes the foregoing mobile electronic device and non-mobile electronic device.

Figure 8:
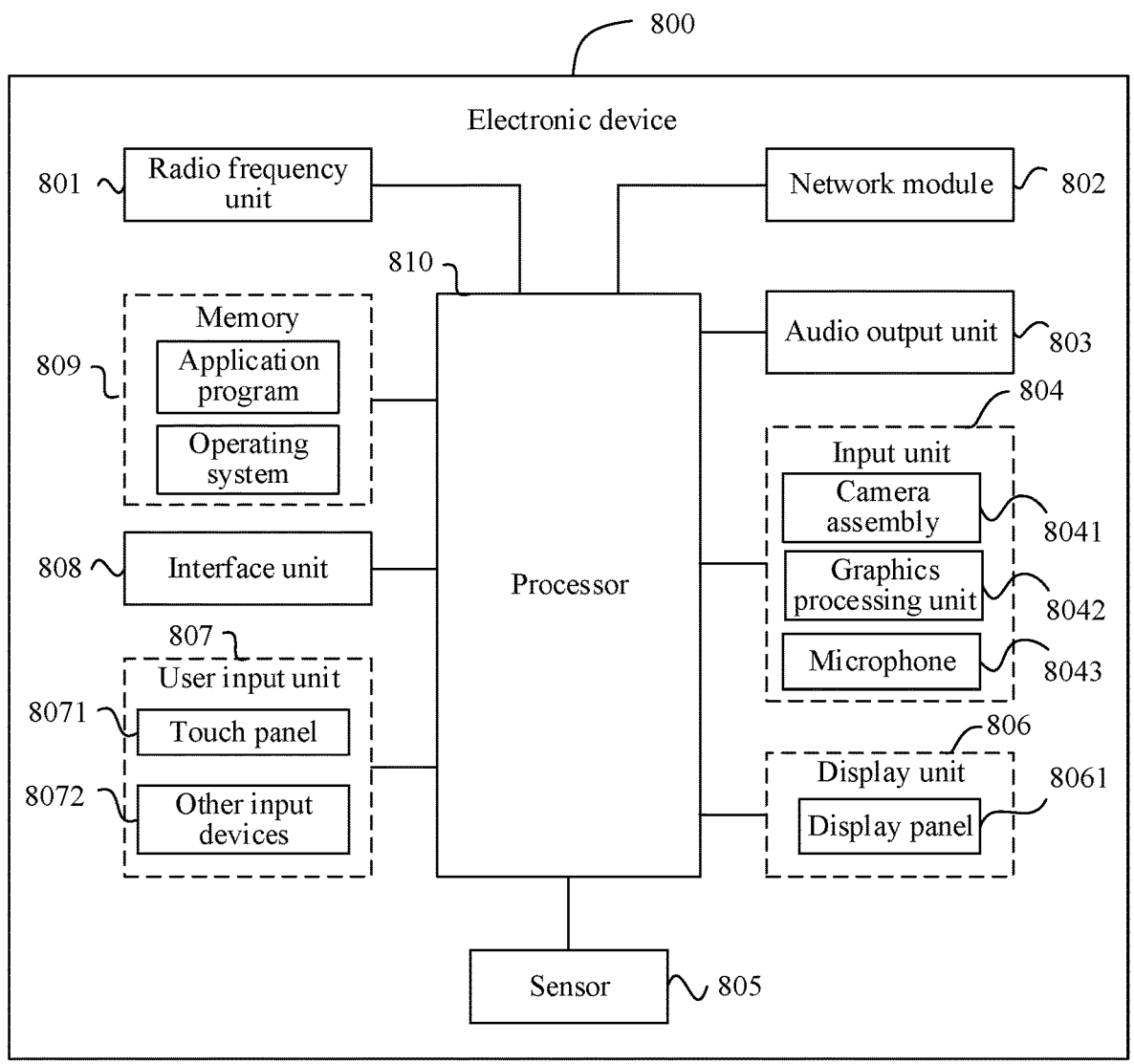
FIG. 8 is a schematic structural diagram of another electronic device according to an embodiment of this application.

FIG. 8 is a schematic diagram of a hardware structure of an electronic device according to an embodiment of this application.

The electronic device 800 includes but is not limited to components such as a radio frequency unit 801, a network module 802, an audio output unit 803, an input unit 804, a sensor 805, a display unit 806, a user input unit 807, an interface unit 808, a memory 809, and a processor 810.

In this embodiment of this application, the input unit 804 may include a camera assembly 8041. The camera assembly 8041 may include a first camera, a second camera, a free gimbal, and a fixed gimbal. The first camera is mounted on the free gimbal, and the free gimbal controls an actual shooting position of the first camera to remain unchanged in an image shooting process. The second camera is mounted on the fixed gimbal, and the fixed gimbal controls the second camera to move along with the electronic device 800 in the image shooting process.

Those skilled in the art can understand that the electronic device 800 may further include a power supply (for example, battery) that supplies power to various components. The power supply may be logically connected to the processor 810 via a power management system, so that functions such as charge and discharge management and power consumption management are implemented via the power management system. The structure of the electronic device shown in FIG. 8 does not constitute any limitation on the electronic device. The electronic device may include more or fewer components than shown in the figure, or combine some of the components, or arrange the components differently. Details are not described herein again.

The user input unit 807 is configured to receive a first input for triggering image shooting.

The processor 810 is configured to obtain, in response to the first input, multiple frames of first images shot by the first camera and multiple frames of second images shot by the second camera; and composite the multiple frames of first images and the multiple frames of second images to obtain a composite image.

Optionally, the processor 810 is further configured to select a first target image from the multiple frames of first images and selecting multiple frames of second target images from the multiple frames of second images; and complement image content of the first target image by using the multiple frames of second target images, to obtain the composite image; where the first target image is an image with the highest definition in the multiple frames of first images, and the multiple frames of second target images are images respectively shot when the second camera is rotated to different angles.

Optionally, the processor 810 is further configured to stop the shooting process when it is detected that a rotation angle of the free gimbal reaches the preset threshold or when the user input unit 807 has received an input for triggering a stop of image shooting.

Optionally, the user input unit 807 is further configured to receive a second input for the multiple frames of first images and the multiple frames of second images.

Optionally, the processor 810 is further configured to select, in response to the second input, the first target image from the multiple frames of first images and the multiple frames of second target images from the multiple frames of second images.

Optionally, the displaying unit 806 is further configured to display an image shot by the second camera on a preview screen.

The electronic device 800 provided in this embodiment of this application can implement the processes that are implemented in the method embodiment of FIG. 1, with the same technical effects achieved. To avoid repetition, details are not described herein again.

It should be understood that in this embodiment of this application, the input unit 804 may further include a graphics processing unit (graphics processing unit, GPU) 8042 and a microphone 8043. The graphics processing unit 8042 processes image data of a static picture or a video that is obtained by an image capture apparatus (for example, the camera assembly 8041) in an image capture mode or a video capture mode. The display unit 806 may include a display panel 8061. The display panel 8061 may be configured in a form of a liquid crystal display, an organic light-emitting diode display, or the like. The user input unit 807 includes a touch panel 8071 and other input devices 8072. The touch panel 8071 is also referred to as a touchscreen. The touch panel 8071 may include two parts: a touch detection apparatus and a touch controller. The other input devices 8072 may include but are not limited to a physical keyboard, a function button (for example, a volume control button or a power on/off button), a trackball, a mouse, and a joystick. Details are not described herein. The memory 809 may be configured to store software programs and various data which include but are not limited to an application program and an operating system. The processor 810 may integrate an application processor and a modem processor. The application processor mainly processes an operating system, a user interface, an application program, and the like. The modem processor mainly processes wireless communication. It can be understood that the modem processor may alternatively be not integrated in the processor 810.

An embodiment of this application further provides a readable storage medium, where the readable storage medium stores a program or instructions, and when the program or instructions are executed by a processor, the processes of the foregoing image shooting method embodiments are implemented, with the same technical effects achieved. To avoid repetition, details are not described herein again.

The processor is the processor in the electronic device in the foregoing embodiments. The readable storage medium includes a computer-readable storage medium such as a computer read-only memory (Read-Only Memory, ROM), a random access memory (Random Access Memory, RAM), a magnetic disk, or an optical disc.

An embodiment of this application further provides a chip. The chip includes a processor and a communication interface, the communication interface is coupled to the processor, and the processor is configured to run a program or instructions to implement the processes of the foregoing image shooting method embodiments, with the same technical effects achieved. To avoid repetition, details are not described herein again.

It should be understood that the chip mentioned in this embodiment of this application may also be referred to as a system-level chip, a system chip, a chip system, a system-on-chip, or the like.

It should be noted that the terms "include", "comprise", or any of their variants are intended to cover a non-exclusive inclusion, such that a process, method, article, or apparatus that includes a series of elements includes not only those elements but also other elements that are not expressly listed, or further includes elements inherent to such process, method, article, or apparatus. Without more constraints, an element preceded by "includes a . . . " does not preclude the presence of other identical elements in the process, method, article, or apparatus that includes the element. In addition, it should be noted that the scopes of the method and apparatus in the embodiments of this application are not limited to performing functions in the sequence shown or discussed, and may further include performing functions at substantially the same time or in a reverse sequence according to the involved functions. For example, the described method may be performed in a sequence different from the described sequence, and steps may be added, omitted, or combined. In addition, features described with reference to some examples may be combined in other examples.

According to the description of the foregoing embodiments, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is an example embodiment. Based on such an understanding, the technical solutions of this application essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

Persons of ordinary skill in the art may be aware that the units and algorithmic steps in the examples described with reference to the embodiments disclosed herein can be implemented by electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of this disclosure.

It may be clearly understood by persons skilled in the art that for the purpose of convenient and brief description, for a detailed working process of the foregoing system, apparatus, and unit, reference may be made to a corresponding process in the foregoing method embodiments, and details are not described herein again.

In the embodiments provided in this application, it should be understood that the disclosed apparatus and method may be implemented in other manners. For example, the described apparatus embodiments are merely examples. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be indirect couplings or communication connections through some interfaces, devices or units, and may be in electrical, mechanical, or other forms.

The units described as separate parts may or may not be physically separate. Components displayed as units may or may not be physical units, that is, they may be located in one position, or may be distributed on multiple network units. Some or all of the units may be selected based on actual requirements to achieve the objectives of the solutions of the embodiments.

In addition, the functional units in the embodiments of this disclosure may be integrated into one processing unit, or each of the units may exist alone physically, or two or more units may be integrated into one unit.

The foregoing describes the embodiments of this application with reference to the accompanying drawings. However, this application is not limited to the foregoing specific embodiments. These specific embodiments are merely illustrative rather than restrictive. Inspired by this application, persons of ordinary skill in the art may develop many other forms without departing from the essence of this application and the protection scope of the claims, and all such forms shall fall within the protection scope of this application.

What is claimed is:

1. An image shooting method, applied to an electronic device, wherein the electronic device comprises a first camera, a second camera, a free gimbal, and a fixed gimbal, the first camera being mounted on the free gimbal and the second camera being mounted on the fixed gimbal, and the method comprises:

receiving a first input for triggering image shooting;

obtaining, in response to the first input, multiple frames of first images shot by the first camera and multiple frames of second images shot by the second camera, wherein in an image shooting process, the free gimbal controls an actual shooting position of the first camera to remain unchanged, and the second camera on the fixed gimbal moves along with the electronic device, so that the second camera remains stationary with respect to the electronic device; and compositing the multiple frames of first images and the multiple frames of second images to obtain a composite image;

wherein when the electronic device rotates in a positive direction, the free gimbal controls the first camera on it to rotate in a negative direction, or when the electronic device rotates in a negative direction, the free gimbal controls the first camera on it to rotate in a positive direction.

2. The method according to claim 1, wherein the compositing the multiple frames of first images and the multiple frames of second images to obtain a composite image comprises:

selecting a first target image from the multiple frames of first images and selecting multiple frames of second target images from the multiple frames of second images; and complementing image content of the first target image by using the multiple frames of second target images, to obtain the composite image; wherein the first target image is an image with the highest definition in the multiple frames of first images, and the multiple frames of second target images are images respectively shot when the second camera is rotated to different angles.

3. The method according to claim 1, wherein the method further comprises:

stopping the shooting process when it is detected that a rotation angle of the free gimbal reaches a preset threshold or when an input for triggering a stop of image shooting has been received.

4. The method according to claim 2, wherein the selecting a first target image from the multiple frames of first images and selecting multiple frames of second target images from the multiple frames of second images comprises:

receiving a second input for the multiple frames of first images and the multiple frames of second images; and selecting, in response to the second input, the first target image from the multiple frames of first images and the multiple frames of second target images from the multiple frames of second images.

5. The method according to claim 1, wherein the method further comprises:

displaying an image shot by the second camera on a preview screen.

6. An image shooting apparatus applied to an electronic device, wherein the electronic device comprises a first camera, a second camera, a free gimbal, and a fixed gimbal, the first camera being mounted on the free gimbal, and the second camera being mounted on the fixed gimbal, and the apparatus comprises:

a receiving module configured to receive a first input for triggering image shooting;

an obtaining module configured to obtain, in response to the first input, multiple frames of first images shot by the first camera and multiple frames of second images shot by the second camera, wherein in an image shooting process, the free gimbal controls an actual shooting position of the first camera to remain unchanged, and the second camera on the fixed gimbal moves along with the electronic device, so that the second camera remains stationary with respect to the electronic device; and a compositing module configured to composite the multiple frames of first images and the multiple frames of second images to obtain a composite image;

wherein when the electronic device rotates in a positive direction, the free gimbal controls the first camera on it to rotate in a negative direction, or when the electronic device rotates in a negative direction, the free gimbal controls the first camera on it to rotate in a positive direction.

7. The apparatus according to claim 6, wherein the compositing module comprises:

a selecting unit configured to select a first target image from the multiple frames of first images and selecting multiple frames of second target images from the multiple frames of second images; and a compositing unit configured to complement image content of the first target image by using the multiple frames of second target images, to obtain the composite image; wherein the first target image is an image with the highest definition in the multiple frames of first images, and the multiple frames of second target images are images respectively shot when the second camera is rotated to different angles.

8. The apparatus according to claim 6, wherein the apparatus further comprises:

a control module configured to stop the shooting process when it is detected that a rotation angle of the free gimbal reaches a preset threshold or when an input for triggering a stop of image shooting has been received.

9. The apparatus according to claim 7, wherein the selecting unit comprises:

a receiving subunit configured to receive a second input for the multiple frames of first images and the multiple frames of second images; and a selecting subunit configured to select, in response to the second input, the first target image from the multiple frames of first images and the multiple frames of second target images from the multiple frames of second images.

10. The apparatus according to claim 6, wherein the apparatus further comprises:

a display module configured to display an image shot by the second camera on a preview screen.

11. An electronic device, comprising a processor, a memory, and a program or instructions stored in the memory and capable of running on the processor, wherein the program or instructions are executed by the processor to perform:

receiving a first input for triggering image shooting;

obtaining, in response to the first input, multiple frames of first images shot by a first camera mounted on a free gimbal and multiple frames of second images shot by a second camera mounted on a fixed gimbal, wherein in an image shooting process, the free gimbal controls an actual shooting position of the first camera to remain unchanged, and the second camera on the fixed gimbal moves along with the electronic device, so that the second camera remains stationary with respect to the electronic device; and compositing the multiple frames of first images and the multiple frames of second images to obtain a composite image;

wherein when the electronic device rotates in a positive direction, the free gimbal controls the first camera on it to rotate in a negative direction, or when the electronic device rotates in a negative direction, the free gimbal controls the first camera on it to rotate in a positive direction.

12. The electronic device according to claim 11, wherein when compositing the multiple frames of first images and the multiple frames of second images to obtain a composite image, the program or instructions are executed by the processor to perform:

selecting a first target image from the multiple frames of first images and selecting multiple frames of second target images from the multiple frames of second images; and complementing image content of the first target image by using the multiple frames of second target images, to obtain the composite image; wherein the first target image is an image with the highest definition in the multiple frames of first images, and the multiple frames of second target images are images respectively shot when the second camera is rotated to different angles.

13. The electronic device according to claim 11, wherein the program or instructions are executed by the processor to perform:

stopping the shooting process when it is detected that a rotation angle of the free gimbal reaches a preset threshold or when an input for triggering a stop of image shooting has been received.

14. The electronic device according to claim 12, wherein when selecting a first target image from the multiple frames of first images and selecting multiple frames of second target images from the multiple frames of second images, the program or instructions are executed by the processor to perform:

receiving a second input for the multiple frames of first images and the multiple frames of second images; and selecting, in response to the second input, the first target image from the multiple frames of first images and the multiple frames of second target images from the multiple frames of second images.

15. The electronic device according to claim 11, wherein the program or instructions are executed by the processor to perform:

displaying an image shot by the second camera on a preview screen.

16. A non-transitory computer-readable storage medium, wherein the non-transitory computer-readable storage medium stores a program or instructions, and when the program or instructions are executed by a processor, the steps of the image shooting method according to claim 1 are implemented.

17. A chip, comprising a processor and a communication interface, wherein the communication interface is coupled to the processor, and the processor is configured to run a program or instructions to implement the steps of the image shooting method according to claim 1.

* * * * *